J. D. PENNOCK, E. C. WITHERBY, W. H. BLAUVELT, E. N. TRUMP & C. G. TUFTS.
ART OF RECOVERING AMMONIA FROM AMMONIACAL LIQUOR AND APPARATUS THEREFOR.
APPLICATION FILED OCT. 19, 1909.
1,012,273.
Patented Dec. 19, 1911.
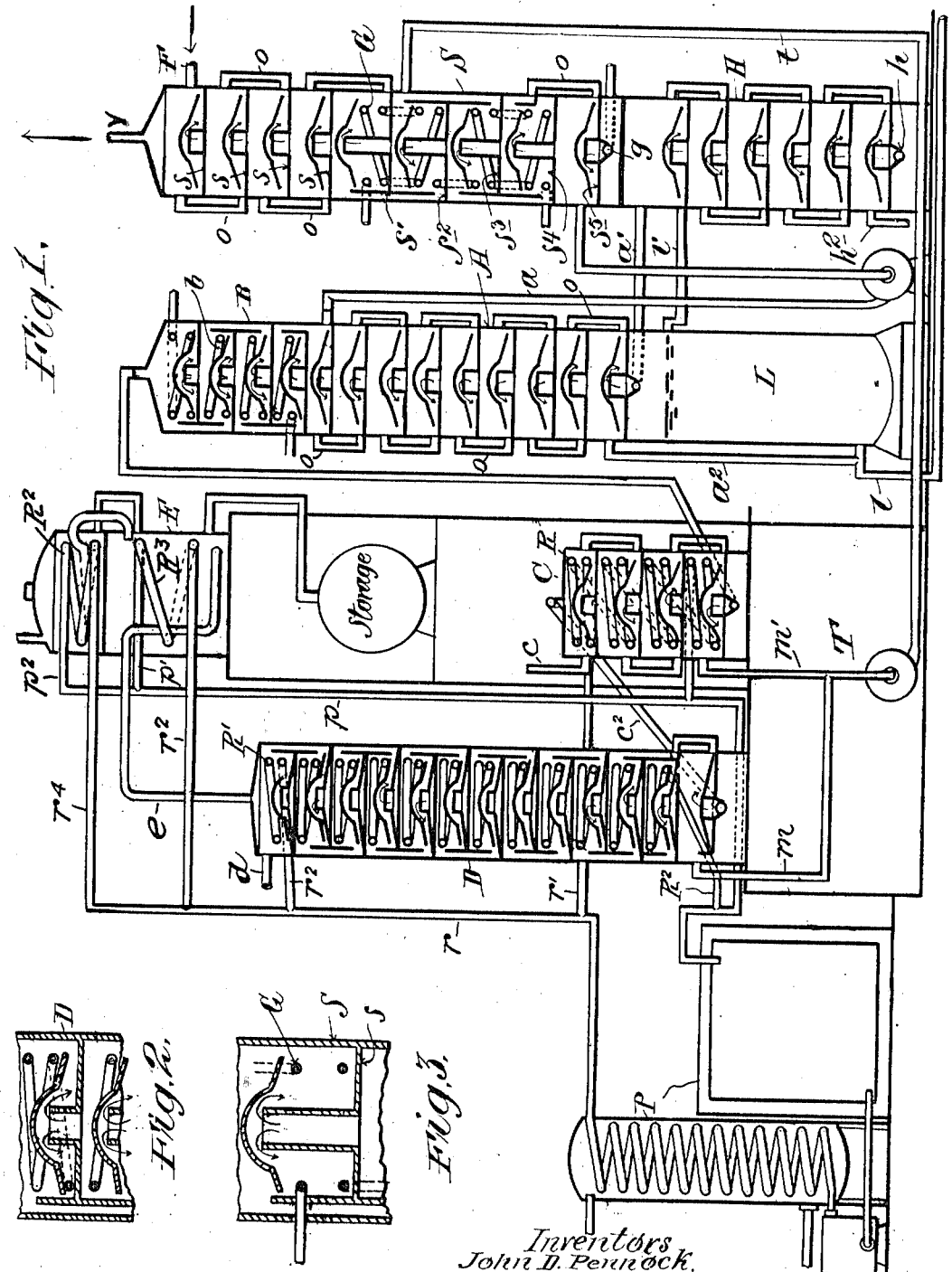
Witnesses:
Inventors
John D. Pennock.
Edwin C. Witherby.
William H. Blauvelt.
Edward N. Trump.
Charles G. Tufts
By their Attorney Clarkson A. Collins

UNITED STATES PATENT OFFICE.

JOHN D. PENNOCK AND EDWIN C. WITHERBY, OF SOLVAY, AND WILLIAM H. BLAUVELT, EDWARD N. TRUMP, AND CHARLES G. TUFTS, OF SYRACUSE, NEW YORK, ASSIGNORS TO SEMET-SOLVAY COMPANY, OF SYRACUSE, NEW YORK, A CORPORATION OF PENNSYLVANIA.

ART OF RECOVERING AMMONIA FROM AMMONIACAL LIQUOR AND APPARATUS THEREFOR.

1,012,273.     Specification of Letters Patent.     Patented Dec. 19, 1911.

Application filed October 19, 1909. Serial No. 523,536.

*To all whom it may concern:*

Be it known that we, JOHN D. PENNOCK and EDWIN C. WITHERBY, residing at Solvay, and WILLIAM H. BLAUVELT, EDWARD N. TRUMP and CHARLES G. TUFTS, residing at Syracuse, both in the county of Onondaga and State of New York, and all citizens of the United States, have invented certain new and useful Improvements in the Art of Recovering Ammonia from Ammoniacal Liquor and Apparatus Therefor, of which the following is a specification.

In an application for Letters Patent heretofore filed by us March 30th, 1909, Serial No. 486,778, we have described a process for the purification of ammonia obtained by the distillation of ammoniacal liquor, such as is produced from the destructive distillation of coal.

The process therein described is directed to the quality of the ammonia product, which is freed from the accompanying impurities by washing the impure products of distillation in a saturated solution of ammonia at a low temperature, and involves the drawing off from the washer or purifier employed therein of the overflow of the solution in which the ammonia gas has been washed. This liquid overflow not only contains the impurities separated from the ammonia in the washer, but also a large percentage of ammonia, since the overflow itself is, primarily, a saturated solution of ammonia, the loss of which would, in an operation directed to the recovery of ammonia only, make the output of ammonia much less than the total ammonia content of the ammoniacal liquor. Another source of possible loss of ammonia is the fixed ammonia which cannot be separated from the ammoniacal liquor by heat alone.

The object of our present invention is to supplement the process described in our said application and, by obviating the possible loss of ammonia therein from either of the causes indicated above to enable the theoretically complete quantitative recovery in the shape of refined ammonia of the entire ammonia content of the ammoniacal liquor to be effected.

It is well known that, of the volatile organic matter present, with ammonia, in ammoniacal liquor, some compounds, such as $H_2S$ and $CO_2$, are present in considerable quantities and that, for this reason and because the ammonia is more readily soluble in water, they can, to a considerable extent be readily separated from the ammonia by heating the liquor and passing the evolved gases through water whereby the ammonia is absorbed and retained while a portion of these impurities escapes. Other volatile organic impurities, however, cannot be initially removed in this manner but because of the small quantities in which they are present in the liquor are absorbed and retained with the ammonia.

In our process, we, at the outset, heat the ammoniacal liquor whereby such compounds as ammonium sulfid and carbonate are dissociated, and the volatile organic matters are volatilized. The resulting gases are caused to pass through the incoming ammoniacal liquor whereby the ammonia and those impurities which are present in only small quantities are absorbed while a considerable proportion of those present in large quantity is eliminated from the system. The liquor containing the ammonia with the still present impurities is then again heated to drive off its volatile constituents and the resulting gases are then treated in the manner described in our application above referred to, whereby the impurities present are absorbed in a saturated solution of ammonia, while the unabsorbed ammonia passes off in a pure state. The overflow from the washer, in which the absorbed impurities are contained, is then added to the incoming ammoniacal liquor and the contained impurities are thus again returned to and absorbed by the solution in the washer. In this manner, those impurities originally present in small proportions in the ammoniacal liquor are concentrated until they have so accumulated that, when volatilized, they will pass the incoming ammoniacal liquor, without being reabsorbed, in the same manner as those originally present in quantity, and thus be eliminated from the system. Thus a portion of the free ammonia passing through the system continuously passes off as purified ammonia, this being continuously replaced by the ammonia content of the ammoniacal liquor fed in, while another portion is condensed with the impurities and again passed through the system; a portion of the impurities present, which, as the operation progresses, will substantially equal the amount being introduced in the ammoniacal liquor, is continuously removed from the system in gaseous form, while another portion passes through the system to be condensed and removed in the overflow from the washer. Thus a continuous operation is provided in which the ammonia entering in the ammoniacal liquor is constantly withdrawn as purified ammonia gas, without any progressive increase in the amount of impurities present, or choking of the operation thereby, and, by also recovering the fixed ammonia as hereinafter explained, practically the entire ammonia content is recovered as high grade ammonia.

The details of the process will be best understood by describing it in connection with the accompanying diagrammatic illustrations of a form of apparatus which may conveniently be used in its practice.

Figure 1 of the drawings shows a section of the apparatus, and Figs. 2 and 3, enlargements of portions thereof.

Referring to the drawings, S indicates a stack composed of superposed pans so constructed, in a well known manner, as to provide a water seal between each pan and the one next above it, whereby gases on their way through the stack are forced to pass through the liquid in the pans on their way from pan to pan.

The pans composing the lower portion of the stack are provided with steam heating pipes or coils, G, and also with an inlet, $g$, for free steam whereby the liquid in the lower pans is heated and at the same time agitated so as to more completely effect the volatilization and expulsion therefrom of the volatile impurities.

The ammoniacal liquor entering the upper part of the stack, S, as by a pipe, F, at a uniform rate of flow, passes downward from pan to pan and is heated in the lower pans, $s^1$ to $s^4$, of the stack, by the steam in the coils, G, and that entering from the pipe, $g$; ammonia and accompanying impurities are volatilized and pass up through the liquor in the pans, $s, s, s$, above the heating zone. The volatilized ammonia, together with those volatilized impurities which are present in small quantity only, is absorbed by the incoming weak ammoniacal liquor, while a notable proportion of those impurities which are present in considerable quantity, such as $CO_2$ and $H_2S$, are not absorbed, but pass out of the system by the vent, V. To effect as complete absorption of the ammonia as possible, while permitting the escape of a maximum amount of impurities, regard must be had to the temperature of the incoming ammoniacal liquor, which should not much exceed 35° C., and also to the number of the pans, $s, s$, above the heating zone, or in other words, to the amount of unheated liquid and the proportion the amount of such liquid bears to its temperature. In general terms the colder the liquid through which the volatilized gases pass the smaller need be its quantity, and vice versa. The exact relations can be readily determined by experiment under given conditions, the desired limit of absorption being the point at which all the ammonia is absorbed and retained.

From the bottom pan, $s^5$, the accumulated liquor flows or is pumped into the upper pan of a still, A, in which it is heated in any usual or suitable manner, as by steam admitted into the still A through pipe, $a'$, which is connected with the upper part of a still H, so as to drive off the free ammonia with the other volatile elements. The pipe $a'$, not only conveys to still A, steam (originally admitted to still H, through pipe $h$), but also carries ammonia from the fixed ammonia compounds, set free in still H, as hereinafter explained. The gases set free in the still, A, then pass through a dehydrater, B, where they are cooled by means of a cooling liquid flowing in pipes, $b$, so as to condense out the accompanying steam, the water of condensation flowing back into the still, A. The ammonia gas, with the accompanying gaseous impurities, then passes to the washer or purifier consisting of a stack or stacks, C, D, of superposed pans with interposed water seals, wherein the ammonia is purified by being caused to pass through a saturated solution of ammonia cooled, as by means of refrigerated brine from a refrigerating apparatus, P, or otherwise, as described in our application above referred to, the impurities being absorbed by and retained in the saturated solution of ammonia while the purified ammonia gas passes out from the top of the washer by a pipe, $e$, to be collected, as in an absorber, E, or otherwise collected or treated in any desired manner.

The washer, C, D, the two parts of which are connected by a pipe, $c^2$, is constructed in a well known manner of superposed pans with openings for the passage of the gases upward from pan to pan and with connecting pipes or passages for the flow of liquid downward from pan to pan. In connection with the washer, $r$ indicates a main pipe leading from the refrigerating apparatus, P, connected with which are branch pipes, $r^1, r^2, r^3, r^4$, leading to cooling coils, R, $R^1$, $R^2, R^3$. From the cooling coils the cooling liquid is returned to the tank of the refrigerating apparatus, P, by branch pipes, $p^1$, $p^2$, $p^3$, $p^4$, connected with a main return pipe, $p$.

The saturated solution of ammonia in the washer may be maintained by the absorption of a portion of the ammonia gas coming from the still in pure water, or in a solution of ammonia less than saturated, or if desired, a saturated solution of ammonia may be admitted to the washer, as by pipes $c$ and $d$, in which case all the ammonia coming from the still will be recovered in the first place.

The overflow from the washer, consisting of a saturated solution of ammonia with the deposited impurities contained therein, is drawn off therefrom by pipes $m$ $m'$, and is returned to the heating stack, S, in any suitable manner, as by a pump, T, and revolatilized. The overflow must be returned to the heating stack, S, at such a point as not to disturb the balance between the absorption of ammonia in the upper part of the stack and the escape of impurities, as will be well understood by those skilled in the art.

The volatilized ammonia of the overflow will be reabsorbed by the incoming weak ammoniacal liquor, in the same manner as that volatilized therefrom in the first instance, and will pass with the liquor back to the still, and thence again to the washer. Those impurities also which are not present in sufficient quantity to pass the incoming ammoniacal liquor and thus be eliminated from the system at the top of the heating stack, S, will be reabsorbed and again returned to the washer, and will thus be circulated through the system until they finally become so concentrated as to pass off in the same manner as those do which are originally present in the ammoniacal liquor in quantity. Thus a balance of elimination and recovery is eventually established, when an amount of each impurity present equal to the total amount thereof entering in the ammoniacal liquor is being continuously eliminated through vent V and an amount of purified ammonia equal to the amount of ammonia being introduced continuously passes off through pipe $e$. The gases eliminated from the system through the vent, V, may be collected and treated for the recovery of their contents of value in any desired manner.

*Fixed ammonia.*—In order to make the quantitative recovery of the ammonia as complete as possible, we subject those compounds present in the ammoniacal liquor, such as ammonium sulfate and ammonium chlorid, the ammonia of which is not volatilizable by steam, to the lime treatment in the following manner: From the bottom of the still, A, the hot residual liquid, containing the non-volatile elements of the ammoniacal liquor, which tend to accumulate at this point, pass by pipe, $a^2$, to a tank, L, which is continuously supplied with milk of lime through pipe, $l$. In the tank, L, by contact with excess of lime, the ammonia compounds are dissociated, the ammonia being set free and the acid radicals forming compounds with the lime. The overflow from the lime tank, L, passes by pipe, $l'$, to the upper pan of a still, H, to the bottom of which steam is admitted through pipe, $h$. The dissociation of the fixed ammonia compounds is completed, and the ammonia is volatilized in the still, H, and the ammonia gas, together with steam for heating the still, A, by pipe, $a'$, passes to still, A, whence the ammonia gas passes, along with that volatilized in the still, A, in the first instance. The excess of lime and lime compounds, together with such other non-volatile substances as may have entered the system in the ammoniacal liquor, pass off from the still, H, through the waste pipe, $h^2$. Thus those elements of the ammoniacal liquor which, as associated with the ammonia, are classed as impurities, are not only separated from the ammonia, but are themselves divided into two classes, the vaporizable impurities passing off by the vent, V, in gaseous form, and the non-vaporizable impurities being discharged into the waste through the outlet, $h^2$. Both classes of discharged impurities may be collected and treated in any desired manner for the recovery of their contents of value.

It will be evident from the foregoing that our invention provides a continuous process, simple and economical of operation, in which by the application of properly adjusted temperatures alone (except for the lime treatment) the various constituents of the ammoniacal liquor are, so to speak, assorted, the ammonia content being recovered in a purified state, and the other elements being separated therefrom and discharged from the system.

In practice we find the quantitative results of this process most complete, while the ammonia produced is of such purity as to adapt it for any use.

What we claim as new and desire to secure by Letters Patent is:

1. The hereinbefore described process of recovering purified ammonia from ammoniacal liquor which comprises a series of steps, including the recovery of the fixed ammonia by the lime treatment, in which process the ammoniacal liquor is admitted at one end of the series and the purified ammonia withdrawn at the other end of the series, a part of the impurities being discharged past the incoming ammoniacal liquor and the remainder thereof at the end of the lime treatment, substantially as set forth.

2. The hereinbefore described process of recovering and purifying ammonia, in which the volatilizable impurities accompanying the ammonia are separated therefrom in a washer containing a saturated solution of ammonia, concentrated by being withdrawn from the washer, revolatilized and again returned thereto, and finally eliminated by being discharged from the system past the incoming gas liquor.

3. The hereinbefore described process of recovering purified ammonia from ammoniacal liquor, which consists in initially eliminating a portion of the impurities associated with the ammonia by volatilizing the volatile elements of the liquor and reabsorbing the ammonia in the incoming liquor while permitting the escape of impurites thereby; reheating the liquor so as to volatilize its volatilizable contents and drawing off its non-volatile contents from the still; separating the volatilized impurities from the ammonia by causing their absorption in a saturated solution of ammonia, and recovering the purified ammonia gas; drawing off the saturated solution of ammonia containing the impurities; volatilizing such solution and subjecting it to the action of the incoming ammoniacal liquor, whereby the ammonia thereof is absorbed while impurities are permitted to escape.

4. The hereinbefore described process of treating ammoniacal liquor for the recovery of purified ammonia which consists in continuously maintaining with a portion of its ammonia content a saturated solution of ammonia whereby the remaining portion is freed from the accompanying impurities; uniting the ammonia content of such solution with the ammonia of the incoming gas liquor to be employed and fractionated as before, and at the same time continuously eliminating a portion of the accompanying impurities.

5. In the recovery of purified ammonia from ammoniacal liquor the hereinbefore described method of eliminating the impurities accompanying the ammonia which consists in volatilizing the impurities and causing those which are present in quantity to pass off past the incoming stream of ammoniacal liquor, concentrating the remaining impurities by circulating them through a washer containing a saturated solution of ammonia, and eliminating them in the same way when the necessary degree of concentration is attained, and drawing off the non-volatile impurities in the residual liquor from the still.

6. The hereinbefore described improvement in the art of recovering ammonia from ammoniacal liquor which consists in continuously circulating the volatile impurities, while separating and removing the ammonia, so as to concentrate the impurities, and causing the concentrated impurities to pass off past the incoming ammoniacal liquor.

7. The hereinbefore described improvement in the art of recovering ammonia from ammoniacal liquor which consists in breaking up the non-volatile ammoniacal compounds by the lime treatment, volatilizing the ammonia content thereof, and adding it to the volatile constituents of the liquor and drawing off the non-volatile impurities; separating the ammonia from the volatile impurities by causing the absorption of the latter in a saturated solution of ammonia, and eliminating the impurities from such solution by volatilizing the same and causing the impurities to pass off past the incoming ammoniacal liquor.

8. An organized apparatus for recovering purified ammonia from ammoniacal liquor comprising, in connected succession, a heating stack, having an upper unheated part whereat the ammoniacal liquor is admitted and provided with a vent for impurities, a still wherein the ammoniacal liquor is reheated, a dehydrator, a washer containing a saturated solution of ammonia, means for maintaining the solution of ammonia in the washer and means for returning the overflow from the washer to said heating stack.

9. In an organized apparatus for recovering purified ammonia from ammoniacal liquor the combination of a heating stack, having an upper unheated part whereat the ammoniacal liquor is admitted, a still, a lime tank connected with the still, a heating stack arranged to receive the overflow from the lime tank and to return the volatilized products to the still, a dehydrator, a washer containing a saturated solution of ammonia, means for maintaining the solution of ammonia in the washer and means for returning the overflow from the washer to said first named heating stack.

In witness whereof, we have hereunto subscribed our names this 16th day of October 1909.

JOHN D. PENNOCK.
EDWIN C. WITHERBY.
WILLIAM H. BLAUVELT.
EDWARD N. TRUMP.
CHARLES G. TUFTS.

Witnesses:
JOHN G. HAZARD,
ROYAL E. FOX.